March 5, 1968     J. G. BRYANT     3,371,951

MATERIAL HANDLING FITTINGS

Original Filed Aug. 16, 1965     2 Sheets-Sheet 1

INVENTOR.
John G. Bryant
BY
Synnestvedt & Lechner
ATTORNEYS

March 5, 1968     J. G. BRYANT     3,371,951
MATERIAL HANDLING FITTINGS

Original Filed Aug. 16, 1965     2 Sheets-Sheet 2

INVENTOR.
John G. Bryant
BY
Synnestvedt & Lechner
ATTORNEYS

United States Patent Office 3,371,951
Patented Mar. 5, 1968

3,371,951
MATERIAL HANDLING FITTINGS
John G. Bryant, 15 Ridgewood Road, Radnor, Pa. 19087
Continuation of application Ser. No. 479,796, Aug. 16, 1965. This application Dec. 19, 1966, Ser. No. 611,510
8 Claims. (Cl. 294—82)

ABSTRACT OF THE DISCLOSURE

A materials handling fitting including a rotatable eye and a ring-like means on the eye and movable with respect thereto, the eye and the ring-like means cooperating whereby the fitting is aligned with respect to the loading and the lifting means to maximize the use of the tensile and compressive characteristics of the metal comprising the fitting.

Disclosure

This application is a continuation of my copending application Ser. No. 479,796, filed Aug. 16, 1965 entitled, "Improvements in Material Handling Fittings," and now abandoned.

This invention relates to materials handling equipment and in particular relates to a fitting to connect the material or load to be moved to a handling device such as a power operated crane, winch or the like adapated to exert a lifting and/or pulling force on the load.

More specifically, the invention relates to improvements in fittings for use in applications commonly employing fittings such as eye bolts or ring bolts and the like to connect the load to the handling device.

One of the principal objects of the invention is to provide a fitting having a structure which functions to minimize the possibility of failure under load and thereby reduce danger to personnel and property.

Another important object of the invention is to provide a fitting of the kind in question having a structure which enables greater forces to be transferred as between the handling equipment and the load and thereby increasing load-handling efficiency.

The foregoing is brought about by providing a fitting structure adapted to be aligned with respect to the load and the handling device so as to minimize stress concentration within the fitting and a structure adapted to maximize the use of tensile and compressive characteristics of metal while minimizing shear characteristics.

The details of the invention will be described below in connection with the following drawings wherein.

Figure 1:
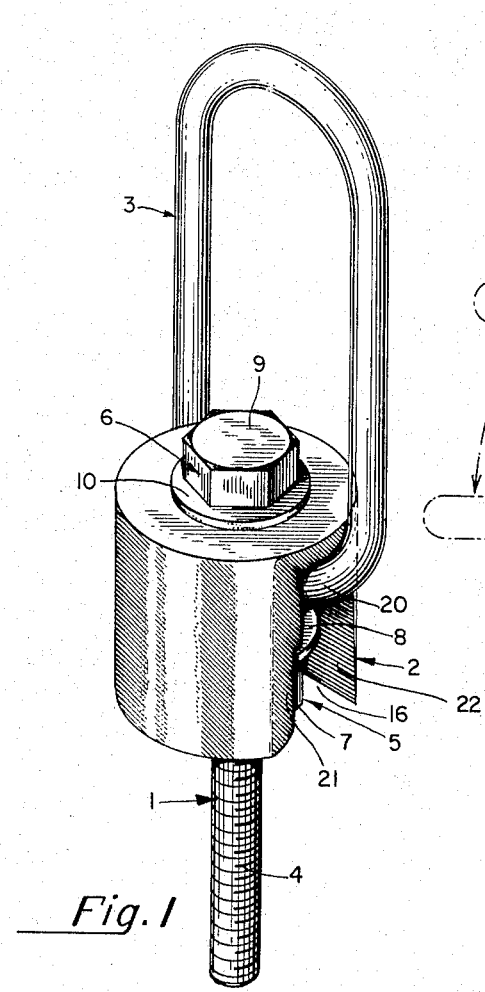
FIGURE 1 is a perspective view of one embodiment of a fitting constructed in accordance with the invention.

As shown in FIGURE 1, the fitting includes a shank 1, an eye 2, and a ring 3. The shank has means in the form of threads 4 for attaching the fitting to the load to be lifted. The ring 3 is adapted to be coupled with a hook or other like piece which is connected to the handling device.

Figure 2:
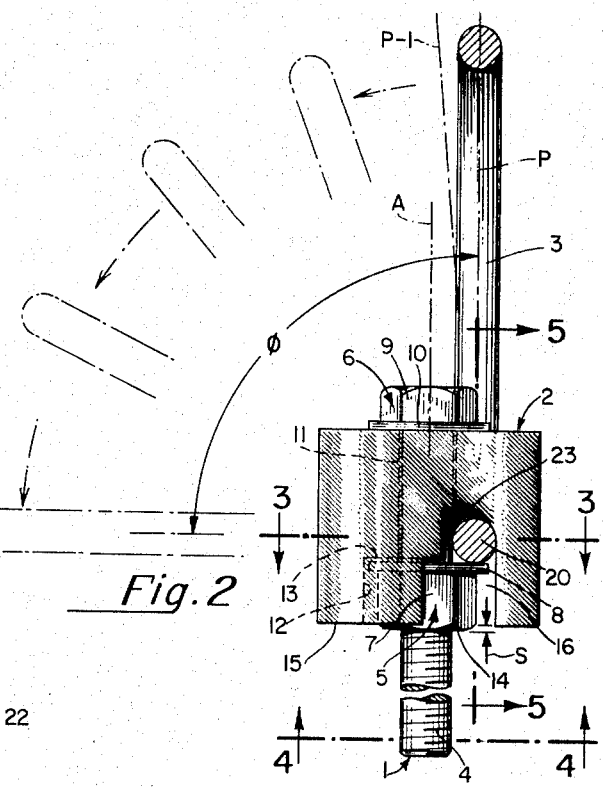
FIGURE 2 is a side elevational view of the fitting shown in FIGURE 1.

As best indicated in FIGURE 2, the shank 1 is in the form of a bolt and has a pair of abutments 5 and 6. The abutment 5 is a nut 7 and washer 8, the nut 7 being threaded on the shank. The abutment 6 is the head 9 of the bolt and the washer 10. The abutment 5 is fixed on the shank as by pinning, by an epoxy resin spread on the threads 4, or by running the nut tight against the unthreaded section of the shank.

The eye 2 is disposed between the abutments 5 and 6 and surrounds the shank. The bore 11 in the eye accommodates the shank. The washer 10 engages the top surface of the eye. The abutment 5 and washer 8 are disposed in a cavity 12 in the eye and the washer 8 is adapted to engage the inner surface 13 of the cavity. The contact between the eye and the shank and the eye and the abutments provide for the eye to be rotatable relative to the shank. The abutments limit the eye against axial movement on the shank, except that which may be necessary to permit said rotation or that which arises out of manufacturing tolerance.

In attaching the fitting to a load, the shank is threaded home and then tightened by the use of a tool on the head 9. The bottom 14 of the nut engages the surface of the load. Under those conditions, the bottom 15 of the eye is slightly spaced from the load. The spacing indicated at S in FIGURE 2 is somewhat exaggerated for descriptive purposes. In practice, the spacing need only an amount sufficient to provide for rotation of the eye.

It is preferable that the eye be freely rotatable throughout 360° azimuth. The rotation is provided for properly aligning the fitting with respect to the load and the handling device as will be explained hereinafter.

Figure 5:
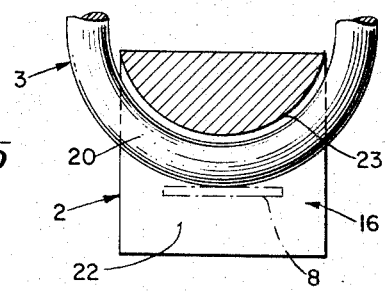
FIGURE 5 is a view taken along the lines 5—5 of FIGURE 2.
Figure 3:
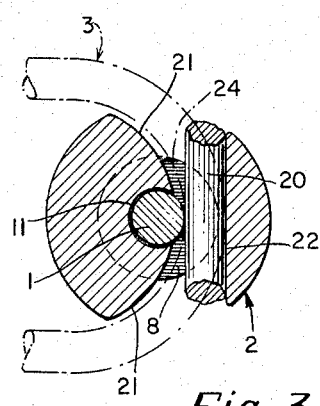
FIGURE 3 is a view taken along the lines 3—3 of FIGURE 2.
Figure 4:
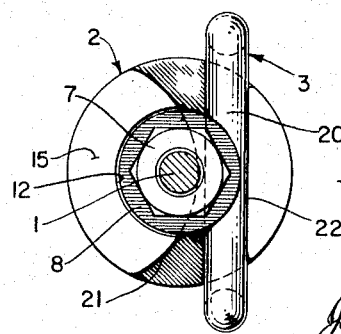
FIGURE 4 is a view taken along the lines 4—4 of FIGURE 2.

The eye 2 is formed with a channel 16. The channel is configured to accommodate the semi-circular end 20 of the ring 3. As seen in FIGURE 3, the inside surface of the channel 16 is arcuate as indicated at 21 and the outside surface of the channel is planar as indicated at 22. Referring to FIGURE 5, the top surface of the channel is also arcuate as indicated at 23. Again, with reference to FIGURE 3 it will be observed that the inside surface 21 of the channel is arranged so that it is open to the shank 4. In other words, the shank extends into the channel. Also it will be observed that the arcuate end 20 of the ring is confined between the shank 4 and the outer surface 22 of the channel. With reference to FIGURE 2, it will be seen that the semi-circular end 20 of the ring is confined on the top by the channel surface 23 and on the bottom by the washer 8.

The foregoing arrangement provides for the ring 3 to be tiltable in elevation. The tilting of the ring takes place in the plane which is normal to the rotational plane of the eye, i.e., a plane normal to the shank axis. The ring is tiltable from a first position indicated by the full lines in FIGURE 2 to any of a plurality of positions indicated, for example by the dot and dash lines.

The angle of the plane of the ring as between the upper and lower positions I have indicated in FIGURE 2 as φ. For lifting and/or pulling purposes, the invention contemplates that the ring be oriented somewhere within the angle φ.

In the upper or first position it will be noted that the ring is oriented so that the plane P of the ring is substantially parallel to the axis A of the shank. In the other positions it will be observed that the shank or the projection of the shank intersects with the plane P of the ring. The first position of the ring is defined by the engagement between the ring and the outer surface 22 of the channel 16. This prevents the ring from moving or tilting toward the right in FIGURE 2. Thus, the ring can only tilt from the first position to the left.

The lowermost position of the ring is defined by the engagement between the semi-circular section 20 and the washer 8. Such engagement is generally indicated at 24 in FIGURE 3. This downward position may be lower than indicated in FIGURE 2, depending upon the radius of the section 20 and the diameter of the washer 9. For handling purposes, however, it is preferred that when the ring is in its lowermost position the plane of the ring is substantially perpendicular to the axis of the shank.

With the foregoing structure it will be apparent that both the ring and eye are rotatable in 360° azimuth and that the ring is tiltable in elevation through the angle φ in any of its rotational positions.

The rotational and tiltable features described above are important because they provide for the fitting to be self-aligning, that is to say, the fitting will be desirably oriented both in azimuth and in elevation with respect to the direction of force exerted by the handling equipment.

For example, many large objects are moved with four-legged bridle slings. In such cases there are four fittings respectively disposed at the corners of a rectangle. For a handling operation each fitting is turned so that its eye points toward the center. Then each ring is coupled by a leg of the sling to the hoist. As the hoist moves up, the leg becomes taut and the ring moves in elevation to follow the upward motion. If each eye is not correctly oriented in azimuth, the tightening of the leg will cause the eye to rotate so that it points the ring directly in line with the leg. Thus it will be apparent that the rotational and tiltable features permit the ring and eye to be desirably oriented in azimuth and for the ring to be desirably oriented in elevation. This alignment provides for the lifting forces to be transmitted through the fitting in a manner which is most compatible with its design.

The foregoing is highly advantageous and desirable because it minimizes the likelihood of high stress concentration within the fitting with the consequent danger of metal failure.

The invention contemplates an arrangement to enhance the alignment feature by preventing coupling to the handling device with the ring in the first position and with the lifting and/or pulling force being directed toward the right-hand side.

This safety feature contemplates arranging the outer surface 22 so that in the first position the portion of the plane of the ring encompassed by the periphery of the ring is oriented at an angle to the axis of the shank. Such a plane orientation is indicated in FIGURE 2 by the line P–1. It will be apparent that this kind of orientation provides for the force of gravity to cause the ring to fall away from the first position. Thus, unless the ring is held by some external means, the ring will be down against the load.

Under the above condition, the natural inclination of the operator is simply to lift up the ring to a position within the angle φ, rotate to the desired position, and then couple the ring to the hoist.

In certain special applications it is necessary for the ring to be capable of swinging through approximately 180°. To accomplish this the outer surface of the cavity is contoured to eliminate the engagement which defines the upper position P or P–1 shown in FIGURE 2. With this arrangement the ring can swing down clockwise. Where this is done it is highly desirable that the eye be configured for additional strength, for example by forming ribs, increasing the amount of metal, or the like.

The eye 2 in addition to serving its important orientation function as described above, further performs an important structural function in the fitting. The eye operates to minimize the bending and shear forces imposed on the shank under load.

With reference to FIGURE 2 it will be apparent that where the ring is oriented somewhere within the angle φ, but slightly above the downward position the force on the ring will cause the eye to move against the upper abutment 23 and also to tilt slightly whereby the bottom 15 of the eye engages the load. Under this condition the eye becomes a relatively massive column which operates to prevent bending of the shank with consequent reduction in the undesirable shear and/or bending forces. Thus the load-carrying capacity of the shank is enhanced and the effect of this is to increase handling efficiency.

When the ring is in the first position indicated by the plane P an upward lift will impose substantially all tension forces on the shank. Any bending moment due to the radial offset between the shank axis and the plane of the ring is compensated for by the column effect of the eye.

In connection with the foregoing it is pointed out that the channel 16 is formed so that the semi-circular section 20 of the ring engages the shank. The invention contemplates that the channel 16 be formed so that it is not open to the shank and therefore there is no engagement between the shank and the ring. However, it is pointed out that the arrangement illustrated is preferred because the moment arm between the ring and the shank is held to a minimum.

Under certain handling conditions there can be a relative shifting of the force vector as respects the load and/or handling device. In keeping with the concept of avoiding stress concentration it is highly desirable and important that the fitting be easily capable of accommodating such shift.

Figure 8:
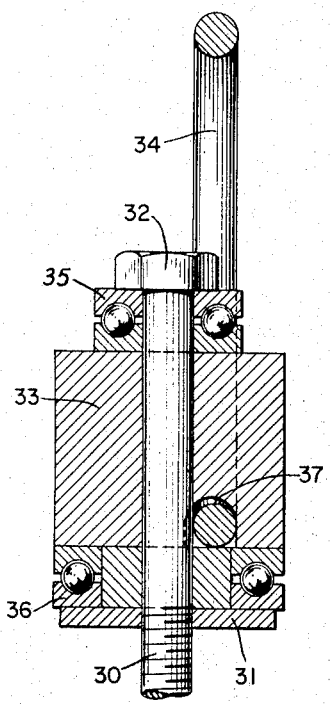
FIGURE 8 is an elevational view partially in section of another embodiment of the invention.

For the above purpose I have provided the embodiment shown in FIGURE 8.

In FIGURE 8 the shank 30 has a pair of abutments 31 and 32 together with an eye 33 and a ring 34. Between each of the abutments and the eye are disposed anti-friction bearings 35 and 36. These bearings in no way change the characteristic operation of the fitting except that they permit easy turning of the eye under very heavy load conditions.

The eye 33 in FIGURE 8 is constructed similarly as the eye 2 in FIGURE 1 in that it is provided with a channel 37 which is open to the shank and has side and top surfaces which confine the ring in the same manner as the surfaces 21, 22 and 23 of the channel 16.

Figure 7:
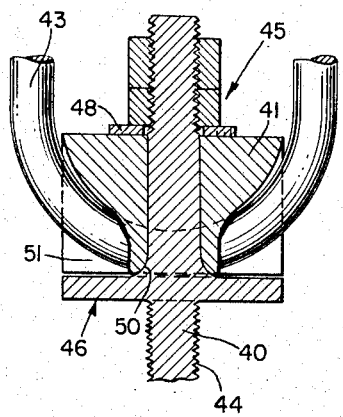
FIGURE 7 is a cross sectional view taken along the lines 7—7 of FIGURE 6.
Figure 6:
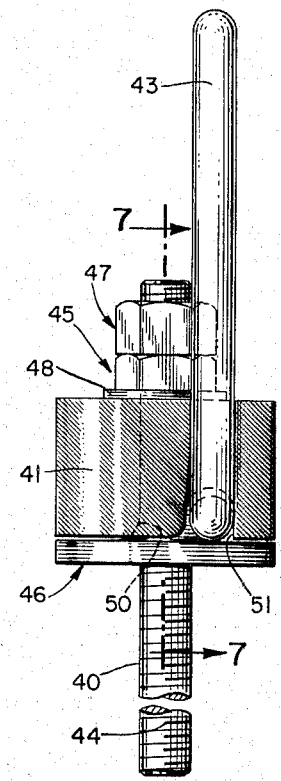
FIGURE 6 is a side elevational view of another embodiment of the invention.

In FIGURES 6 and 7, I have shown an embodiment of the invention which is advantageously configured to further reduce the moment arm between the ring and the weak part of the shank.

The fitting in FIGURES 6 and 7 comprises a shank 40, an eye 41 and a ring 43. The shank is in the form of a stud which has threads 44, an upper abutment 45, and a lower abutment 46. The abutment 45 comprises a pair of nuts 47 and a washer 48. The nuts are pinned to the shank or secured by an epoxy resin. The abutment 46 is preferably formed as an integral part of the shank and has a contoured mesa-like section 50 on its upper surface.

The eye 41 is disposed between the abutments 45 and 46. The top side of the eye engages the washer 48 and the bottom of the eye is contoured to mate with the mesa-like section 50 on its upper surface. The eye has a channel 51 which is formed similarly to the channel 16 in FIGURE 2.

It will be observed that the thickness of the lower abutment 46 and the height of the mesa 50 are relatively small so that the distance between the center of the semicircular section of the ring and the weak point of the shank is much less than the corresponding distance in FIGURE 2.

The mesa section 50 serves to give strength to the lower abutment and this is particularly desirable where the thickness of the abutment has been reduced.

The embodiment of FIGURES 6 and 7 functions in the same way as regards alignment and stress concentration as described heretofore.

It will be understood by those skilled in the art that the rings 3, 34 and 43 are exemplary of means to be connected with the eye for lifting purposes. For example, it is contemplated that the ring be eliminated and a properly shaped hook be used in lieu thereof. In such event, the hook is not necessarily an integral part of the fitting. The hook is separate and is coupled with the eye only for handling purposes. The hook in such instances may be part of the handling device.

In the embodiment shown in FIGURES 2, 6 and 8, I have shown the means for coupling the fitting to the load in the form of threads. It will be apparent to those skilled in the art that many equivalent means can be used. For example, in many instances, the fitting must assume a position on a shoulder on the load. In these cases, the shoulder has a plain aperture accommodating the shank and the shank is fixed on the shoulder by threading a nut on the shank and tightening the nut against the bottom of the shoulder. Another example is where the load to a large measure is comprised of wood. In this case the shank may be in the form of a wood screw.

I claim:
1. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;
an eye surrounding said shank and disposed between said abutments, the eye having means for engaging said abutments, the engagement permitting rotation of the eye with respect to the shank and limiting axial motion of the eye along the shank; and
means forming a channel in said eye, the channel being disposed on one side of the shank adjacent said one abutment, the channel being for use in accommodating a handling ring.

2. A construction in accordance with claim 1 and further including anti-friction bearing means respectively disposed between each said abutment and said eye.

3. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;
an eye surrounding said shank between said abutments, the eye having means for engaging said abutments and said shank, the engagement permitting rotation of the eye with respect to the shank and limiting axial motion of the eye along the shank; and
means forming a channel in said eye, the channel being disposed on one side of said shank adjacent said one abutment and being open to a portion of the shank between the abutments, the channel being for use in accommodating a handling ring.

4. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;
an eye surrounding said shank and disposed between said abutments, the eye having means for engaging said abutments, the engagement permitting rotation of the eye with respect to the shank and limiting axial motion of the eye along the shank;
means forming a channel in said eye, the channel being disposed on one side of the shank adjacent said one abutment, the channel being for use in accommodating handling means; and
handling means in said channel for connecting the fitting to the mechanism for moving the load.

5. A construction in accordance with claim 4 and further including anti-friction bearing means respectively disposed between each said abutment and said eye.

6. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;
an eye surrounding said shank and disposed between said abutments, the eye having means engaging said abutments and said shank, the engagement permitting rotation of the eye with respect to the shank and limiting axial motion of the eye along the shank;
means forming a channel in said eye, the channel being disposed on one side of the shank adjacent said one abutment and being open to a portion of the shank between the abutments;
a handling ring in said channel, the channel and the ring being dimensional to permit tilting of the ring from a first position wherein the plane of the ring is substantially parallel the axis of the shank to any of a plurality of positions wherein the shank and/or the projection of the shank intersects the portion of the plane of the ring encompassed by the periphery of the ring; and
means on said eye engageable with said ring to determine said first position.

7. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;
an eye surrounding said shank and disposed between said abutments, the eye having means engaging said abutments and said shank, the engagement permitting rotation of the eye with respect to the shank and limiting axial motion of the eye along the shank;
means forming a channel in said eye, the channel being disposed on one side of said shank adjacent said one abutment and being open to a portion of the shank between the abutments;
a handling ring in said channel, the channel and the ring being dimensional to permit tilting of the ring from a first position wherein the portion of the plane of the ring encompassed by the periphery of the ring is oriented at an angle to the axis of the shank to any of a plurality of positions wherein the shank and/or the projection of the shank intersects said portion of the plane of the ring; and
means on said eye engageable with said ring to determine said first position.

8. A materials handling fitting;
an elongated shank having mechanism on one end for connecting the shank to a load to be handled;
means on the shank forming a pair of spaced apart abutments, one abutment being adjacent said load connecting mechanism for engaging the load when the shank is connected;

an eye surrounding said shank and disposed between said abutments, the eye having means for engaging said abutments, the engagement permitting rotation of the eye with respect to the shank and limiting axial motion of the eye along the shank;

means forming a channel in said eye, the channel being disposed on one side of the shank adjacent said one abutment; and handling means in said channel for use in connecting the fitting to the mechanism for moving the load.

References Cited

UNITED STATES PATENTS 1,754,692  4/1930  Miller _____ 294—86
3,297,293  1/1967  Andrews _____ 248—361

GERALD M. FORLENZA, *Primary Examiner.*

G. F. ABRAHAM, *Assistant Examiner.*